US012678922B2

(12) United States Patent
Zhang

(10) Patent No.: US 12,678,922 B2
(45) Date of Patent: Jul. 14, 2026

(54) FIRING PIN LOCKING STRUCTURE OF NAILING GUN

(71) Applicant: Huading Zhang, Taizhou (CN)

(72) Inventor: Huading Zhang, Taizhou (CN)

( * ) Notice: Subject to any disclaimer, the term of this patent is extended or adjusted under 35 U.S.C. 154(b) by 0 days.

(21) Appl. No.: 18/787,092

(22) Filed: Jul. 29, 2024

(65) Prior Publication Data

US 2024/0383115 A1 Nov. 21, 2024

Related U.S. Application Data

(63) Continuation of application No. PCT/CN2023/077998, filed on Feb. 23, 2023.

(30) Foreign Application Priority Data

Feb. 24, 2022 (CN) ......................... 202210173205.4

(51) Int. Cl.
*B25C 1/00* (2006.01)

(52) U.S. Cl.
CPC .................................... *B25C 1/008* (2013.01)

(58) Field of Classification Search
USPC ............................ 227/8, 175.4, 175.3, 181.1
See application file for complete search history.

(56) References Cited

U.S. PATENT DOCUMENTS 5,593,079 A * 1/1997 Mukoyama ............. B25C 1/047 227/8
7,182,236 B1 2/2007 Wen
11,759,930 B2 * 9/2023 Jiang ......................... B25C 1/06 227/8
2005/0218181 A1 10/2005 Gross et al.
2009/0090762 A1 4/2009 Leimbach et al.
2009/0321495 A1 12/2009 Hirabayashi et al.
2010/0170929 A1 7/2010 Chang
2011/0248062 A1 * 10/2011 Fujimoto .................. B25C 1/06 227/8
2015/0034693 A1 2/2015 Ronconi et al.
2018/0043518 A1 * 2/2018 Fukinuki ................. B25C 1/008
2018/0126528 A1 5/2018 Pomeroy et al.
2018/0215023 A1 8/2018 Taylor et al.
2019/0375084 A1 12/2019 Bierdeman et al.
2021/0060749 A1 * 3/2021 Yang ....................... B25C 1/008
2023/0059101 A1 * 2/2023 Jiang ......................... B25C 1/06
(Continued)

FOREIGN PATENT DOCUMENTS

CN 108068059 A 5/2018
CN 109605285 A 4/2019
(Continued)

*Primary Examiner* — Praachi M Pathak
(74) *Attorney, Agent, or Firm* — Westbridge IP LLC

(57) ABSTRACT

A nailing gun includes an inner shell and a firing pin capable of moving relative to the inner shell and used for nailing. The inner shell is further provided with a locking member used for indirectly or directly locking the firing pin, the inner shell is further provided with a driving mechanism and a top shaft capable of moving in a vertical direction of the inner shell under driving of the driving mechanism, the top shaft is connected with the locking member, and when the firing pin is unlocked, the top shaft and the locking member are capable of moving in the vertical direction of the inner shell and away from the firing pin.

10 Claims, 9 Drawing Sheets

(56) References Cited

U.S. PATENT DOCUMENTS

| | | | | |
|---|---|---|---|---|
| 2024/0100671 | A1* | 3/2024 | Pomeroy | B25C 1/047 |
| 2025/0114928 | A1* | 4/2025 | Liu | B25C 1/06 |

FOREIGN PATENT DOCUMENTS

| | | | |
|---|---|---|---|
| CN | 111546292 | A | 8/2020 |
| CN | 111791187 | A | 10/2020 |
| CN | 212497592 | U | 2/2021 |

* cited by examiner

FIRING PIN LOCKING STRUCTURE OF NAILING GUN

CROSS-REFERENCE TO RELATED APPLICATIONS

This application is a continuation of International Application No. PCT/CN2023/077998, filed on Feb. 23, 2023, which claims priority to Chinese Patent Application No. 202210173205.4, filed on Feb. 24, 2022. All of the aforementioned applications are incorporated herein by reference in their entireties.

TECHNICAL FIELD

The present disclosure belongs to the technical field of nailing guns, and relates to a nailing gun, and particularly to a firing pin locking structure of a nailing gun.

BACKGROUND

Nailing gun is a product of modern nail fastening technology, which can shoot nails, belongs to direct consolidation technology, and is an essential hand-operated tool for woodworking and building construction. At present, nailing gun products in the market are mainly pneumatic nailing guns, and according to a working principle of the pneumatic nailing guns, high-pressure gas generated by an air pump (air compressor) is used as a power source. When the high-pressure gas is generated, a firing pin is in a locked state, and when the firing pin is unlocked, the high-pressure gas drives the firing pin in an air cylinder of the nailing gun to do a hammering motion, so as to drive a nail in a nail outlet groove into an object or shoots out a row nail. Because the firing pin is subjected to the action of the high-pressure gas, the unlocking and locking of the firing pin are subjected to a great friction force, and the firing pin is worn during use, which may eventually lead to the failure of locking of the firing pin.

The applicant gives a design scheme for the locking structure of the firing pin, and the Chinese Patent Publication No. CN109605285B discloses a nailing gun, which comprises a shell and a firing pin capable of reciprocating relative to the shell, wherein the shell is provided with a locking member and an intermediate member capable of moving relative to the shell, the intermediate member is located between the locking member and the firing pin, and the intermediate member is provided with a first locking portion and a second locking portion capable of being clamped on the firing pin respectively; and the locking member is capable of abutting against the first locking portion and blocking the intermediate member from moving relative to the shell, so that the second locking portion and the firing pin remain clamped, or the locking member is capable of releasing the blocking, so that the second locking portion is capable of moving and disengaging from the firing pin.

In the above structure, when a hinge rod rotates to a position of a shifting block, the shifting block can be triggered to drive the locking member to rotate, and then the locking member can release the blocking to the intermediate member at this time, so that the intermediate member rotates relative to the shell under the pushing of the firing pin and overcomes an elastic force of the torsion spring to disengage from the firing pin, until a second blocking surface on the locking member makes contact with and abuts against a stopping surface on the intermediate member. In the above structure, the intermediate member is rotated to realize unlocking, and still makes contact with the groove of the firing pin for a long time in an unlocking process to generate great friction, and meanwhile, contact between the intermediate member and the locking member also lasts for a long time, which accelerates the abrasion of the firing pin, the intermediate member and the locking member, thus reducing the service life of the nailing gun.

SUMMARY

The present disclosure is intended to provide a firing pin locking structure of a nailing gun aiming at the above problems in the prior art, and the technical problem to be solved by the present disclosure is: how to prolong the service life of the nailing gun.

The object of the present disclosure can be achieved by the following technical solution: a firing pin locking structure of a nailing gun is provided, wherein the nailing gun comprises an inner shell and a firing pin capable of moving relative to the inner shell and used for nailing, the inner shell is further provided with a locking member used for indirectly or directly locking the firing pin, the inner shell is further provided with a driving mechanism and a top shaft capable of moving in a vertical direction of the inner shell under driving of the driving mechanism, the top shaft is connected with the locking member, and when the firing pin is unlocked, the top shaft and the locking member are capable of moving in the vertical direction of the inner shell and away from the firing pin.

In the solution, in an unlocking process of the firing pin, the top shaft and the locking member can move in the vertical direction of the inner shell and away from the firing pin, that is, the locking member and the top shaft move below or above the inner shell, a separation speed of the locking member is high, contact between the locking member and the firing pin or between the locking member and the firing pin and other components is reduced, abrasion between the locking member and the firing pin or between the locking member and the firing pin and other components is relieved, and the service life of the nailing gun is prolonged. The solution provides a technical solution with different technical concept, which can reach the level of the prior art.

In the firing pin locking structure of the nailing gun above, the driving mechanism comprises a turntable arranged in the inner shell, the turntable is provided with at least one boss, one end of the top shaft is connected with the locking member, and the other end of the top shaft is provided with a jacking block capable of abutting against the boss. After the jacking block makes contact with the boss, the top shaft and the locking member both move above the inner shell in the vertical direction of the inner shell, the firing pin is unlocked at this time, when the jacking block is separated from the boss, the firing pin can be locked again or continue to move, the firing pin does not make contact with other objects in the locking structure in a continuous moving process of the firing pin, and in the solution, the movement and reset of the locking member are both controlled by the top shaft, so that the structure is simple, and the smooth locking and unlocking of the firing pin are ensured.

In the firing pin locking structure of the nailing gun above, the top shaft is provided with a reset spring for resetting the top shaft, one end of the reset spring abuts against or is fixed on the top shaft, and the other end of the reset spring abuts against the inner shell. The reset spring is used for resetting in the vertical direction of the top shaft.

In the firing pin locking structure of the nailing gun above, the locking member directly locks the firing pin, the firing pin is further provided with a groove, the locking member comprises a locking portion, and when the firing pin is locked, the locking portion is located in the groove and directly locks the firing pin; and when the firing pin is unlocked, the locking portion is located above or below the groove.

In the firing pin locking structure of the nailing gun above, the inner shell is further provided with a fixing block close to the locking member, the fixing block and the locking member are located on the same side of the firing pin, the fixing block is farther away from the firing pin than the locking member, and when the firing pin is locked, partial structures of the fixing block, the locking member and the firing pin are on the same horizontal plane. The fixing block is used for preventing the locking member from moving in a horizontal direction, thus improving a locking effect of the locking member on the firing pin.

In the firing pin locking structure of the nailing gun above, contact parts between the fixing block and the locking member are all inclined planes and matched; or the fixing block or the locking member has an inclined plane. The fixing block is provided with the inclined plane, and an upper edge of the inclined plane is farther away from or closer to the locking member than a lower edge of the inclined plane. The above structure is beneficial for the locking member to be not easily stuck when the locking member moves vertically towards the inner shell, and provides a certain guiding function for the movement of the locking member.

In the firing pin locking structure of the nailing gun above, the locking member indirectly locks the firing pin, the firing pin is provided with a groove, an intermediate member is arranged between the locking member and the firing pin, the intermediate member is provided with a first locking portion and a second locking portion capable of being clamped on the firing pin respectively, the locking member is capable of abutting against the first locking portion and preventing the intermediate member from moving relative to the inner shell, so that the second locking portion and the groove of the firing pin remain clamped, the inner shell is rotatably connected with a rotating shaft, a torsion spring with one end abutting against the inner shell is sleeved on the rotating shaft, the other end of the torsion spring is fixedly connected to the rotating shaft, the intermediate member is connected to the rotating shaft, and when the firing pin is unlocked, the locking member is located above or below the intermediate member. When the firing pin is unlocked, the intermediate member is driven to rotate, and in an unlocking process of the firing pin, the intermediate member no longer makes contact with the locking member, which reduces the abrasion of the intermediate member and the locking member, and prolongs the service life of the nailing gun.

In the firing pin locking structure of the nailing gun above, the inner shell is further connected with a limiting shaft, the locking member is provided with a limiting hole matched with the limiting shaft, and the limiting shaft is located in the limiting hole. The limiting shaft and the limiting hole act together to prevent the locking member from rotating in a horizontal direction, and when the firing pin is locked, the locking member abuts against the intermediate member, which improves a locking effect of the intermediate member on the firing pin.

In the firing pin locking structure of the nailing gun above, a turntable connected with an output shaft of a motor is also arranged in the inner shell, the turntable is provided with a boss, the top shaft is fixedly connected with the locking member, the top shaft is provided with a reset device with one end capable of abutting against the inner shell, the other end of the reset device abuts against a limiting table of the top shaft, the locking member is further connected with an abutting shaft, one end of the abutting shaft is provided with an ejecting block, and the ejecting block is capable of abutting against the boss.

In the firing pin locking structure of the nailing gun above, peripheries of a boss and a jacking block are arc-shaped, the top shaft is provided with a limiting table or a fixing hole, and the reset spring abuts against the limiting table or is fixed in the fixing hole. The peripheries of the boss and the jacking block are arc-shaped structures, which exert certain guiding and buffering functions in moving the jacking block and the ejecting block to the boss, so that the locking member moves more smoothly.

Compared with the prior art, the present disclosure has the following advantages.

In an unlocking process of the firing pin, the top shaft and the locking member can move in the vertical direction of the inner shell and away from the firing pin, that is, the locking member and the top shaft move above the inner shell, a separation speed of the locking member is high, contact between the locking member and the firing pin or between the locking member and the firing pin and other components is reduced, abrasion between the locking member and the firing pin or between the locking member and the firing pin and other components is relieved, and the service life of the nailing gun is prolonged. The solution provides a technical solution with different technical concept, which can reach the level of the prior art.

The peripheries of the boss and the jacking block are arc-shaped structures, which exert certain guiding and buffering functions in moving the jacking block and the ejecting block to the boss, so that the locking member moves more smoothly.

DETAILED DESCRIPTION OF THE EMBODIMENTS

Figure 1:
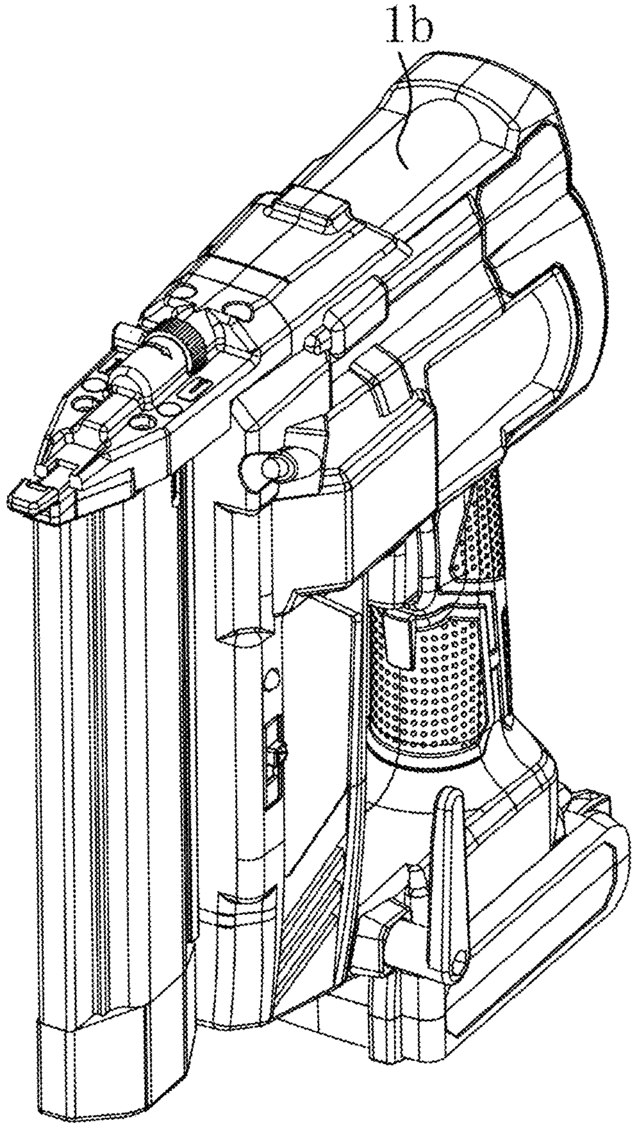
FIG. 1 is a schematic diagram of a stereoscopic structure of the present disclosure.
Figure 2:
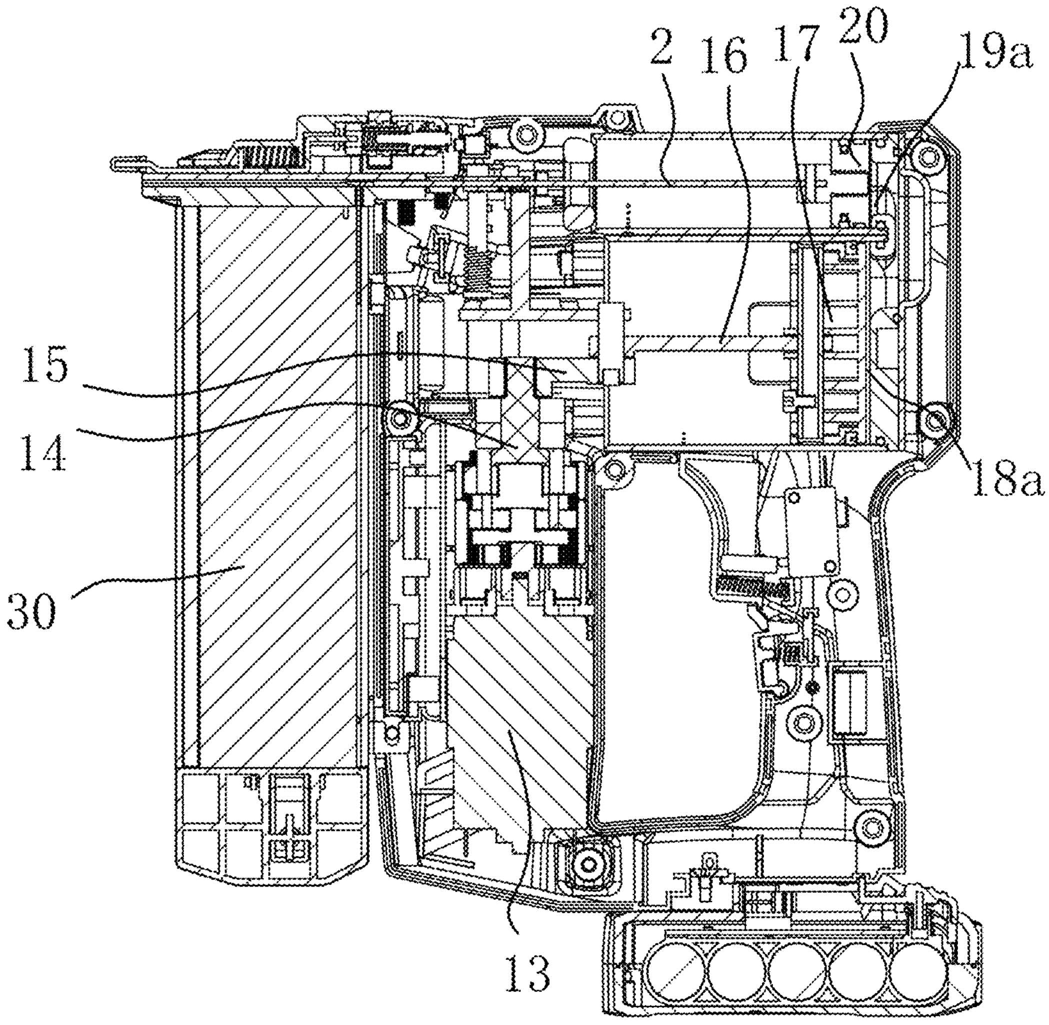
FIG. 2 is a schematic diagram of a sectional structure of the present disclosure.
Figure 3:
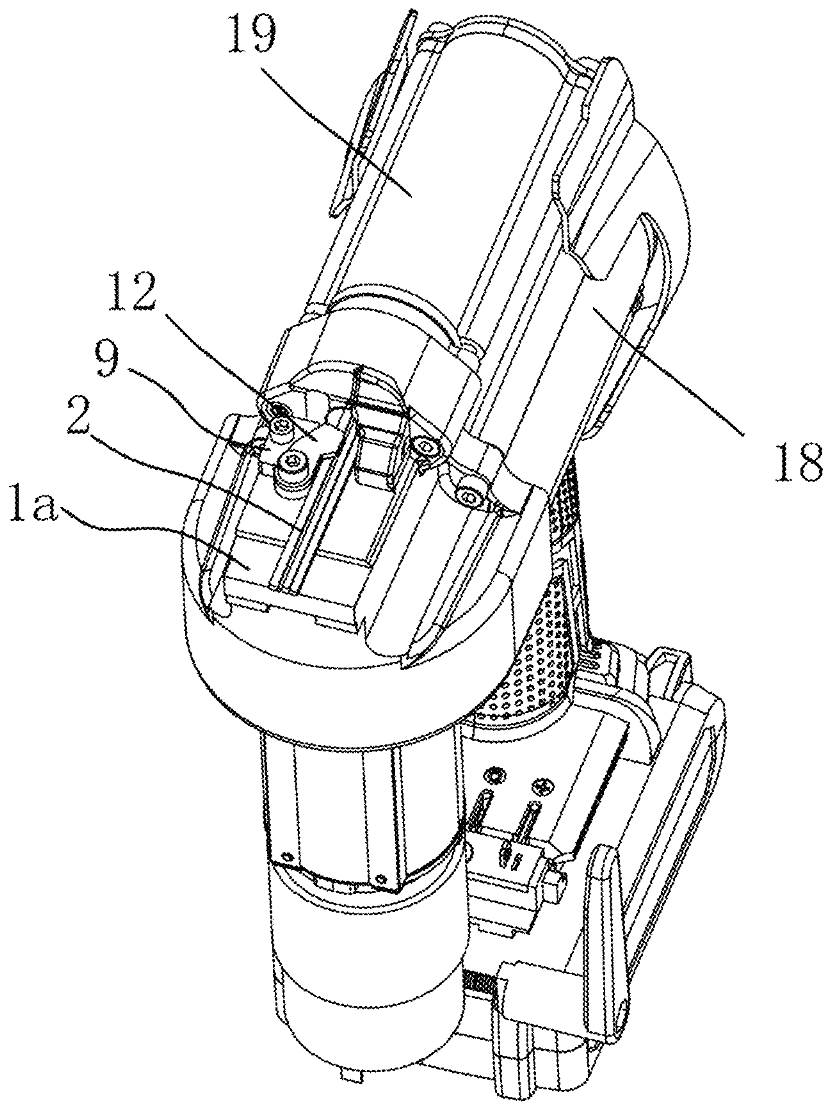
FIG. 3 is a schematic diagram of a partial structure in First Embodiment of the present disclosure.
Figure 4:
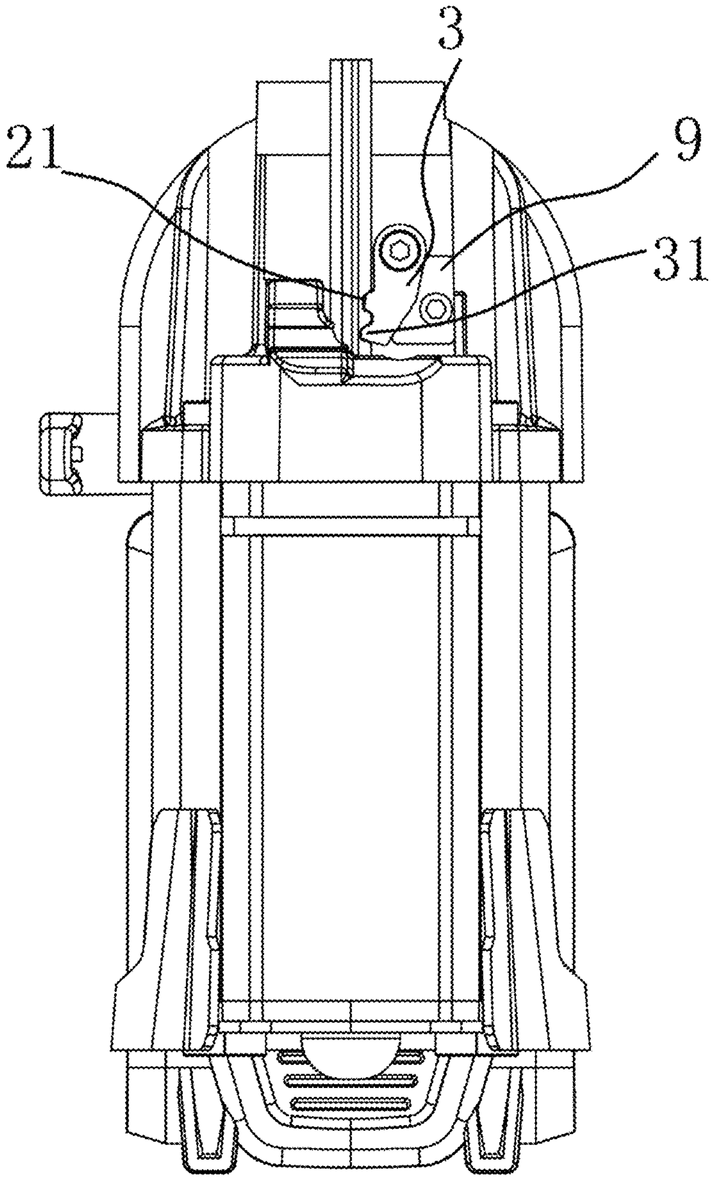
FIG. 4 is a schematic diagram of a partial structure in First Embodiment of the present disclosure.

The following descriptions are specific embodiments of the present disclosure, and with reference to the drawings, technical solutions of the present disclosure are further described, but the present disclosure is not limited to these embodiments.

First Embodiment

As shown in FIG. 1, FIG. 2, FIG. 3 and FIG. 4, a nailing gun comprises an inner shell 1*a*, an outer shell 1*b* and a firing pin 2 capable of moving relative to the inner shell 1*a* for nailing. A first air cylinder 18 and a second air cylinder 19 are also arranged in the inner shell 1*a*, a first piston 17 capable of performing a compression stroke and a return stroke is arranged in the first air cylinder 18, and a first air chamber 18*a* capable of storing air in the first air cylinder 18 is divided by the first piston 17. The first piston 17 is connected with a piston rod 16, and the piston rod 16 is connected with a crank 15. A driving mechanism comprises a motor 13, a gear reducer 14, a turntable 5 and the crank 15. The motor 13 is arranged in the inner shell 1*a*, the motor 13 is connected with the gear reducer 14, an output shaft of the gear reducer 14 is connected with the crank 15, and the piston rod 16 and the crank 15 form a crank-link structure, which changes rotating power of the motor into power for driving the first piston to reciprocate linearly. A second piston 20 is arranged in the second air cylinder 19, and the firing pin 2 is fixedly connected to the second piston 20. A second air chamber 19*a* in the second air cylinder 19 is divided by the second piston 20, and the first air chamber 18*a* and the second air chamber 19*a* are communicated with each other through a fully-closed ventilation channel. The motor 13 drives the first piston 17 to perform the compression stroke and the return stroke. A front end of the inner shell 1*a* is provided with a nail box 30, and a nail in the nail box 30 may automatically rise to a position in front of the firing pin 2 under an action of a spring. After the first piston 17 completes the compression stroke, a firing pin locking structure unlocks the firing pin, so that the firing pin 2 and the second piston 20 are both in an unlocked state, and the second piston 20 moves at a high speed under an action of a high pressure to drive the firing pin 2 to hit the nail in front of the firing pin 2, thus completing a nailing action once. Subsequently, the first piston 17 performs the return stroke, and under an action of a negative pressure, the second piston 20 is pulled back from a position of nail shooting by the firing pin to a position of locking of the firing pin, the firing pin 2 is locked again, and so on, so as to realize continuous nailing.

The firing pin 2 is provided with a groove 21, and the inner shell 1*a* is further provided with a blocking sheet 12, a top shaft 4 and a locking member 3. The blocking sheet 12 and the locking member 3 are both fixed on the top shaft 4, and the blocking sheet 12 is located above the locking member 3. The locking member 3 is provided with a locking portion 31, the firing pin 2 is provided with the locking portion 31 matched with the groove 21 in shape, and the locking member 3 is clamped in the groove 21 through the locking portion 31 to lock the firing pin 2. The inner shell 1*a* is further provided with a fixing block 9 close to the locking member 3, the fixing block 9 and the locking member 3 are located on the same side of the firing pin 2, the fixing block 9 is farther away from the firing pin 2 than the locking member 3, contact parts between the fixing block 9 and the locking member 3 may be set to be inclined planes and matched, and an upper edge of the inclined plane of the fixing block 9 is farther away from the locking member 3 than a lower edge of the inclined plane. When the firing pin 2 is locked by the locking member 3, partial structures of the fixing block 9, the locking member 3 and the firing pin 2 are on the same horizontal plane. The fixing block 9 is used for preventing the locking member 3 from moving in a horizontal direction, thus improving a locking effect of the locking member 3 on the firing pin 2. The fixing block 9 may also be replaced by a structure in which the inner shell 1*a* is further provided with a positioning shaft and the locking member 3 is provided with a positioning hole. The positioning shaft is inserted into the positioning hole, and the partial structures of the locking member 3 and the firing pin 2 are on the same horizontal plane. The positioning shaft is used for preventing the locking member 3 from rotating in a horizontal direction, and the structure of the positioning hole and the positioning shaft can save a space of a locking structure of the firing pin 2.

Figure 5:
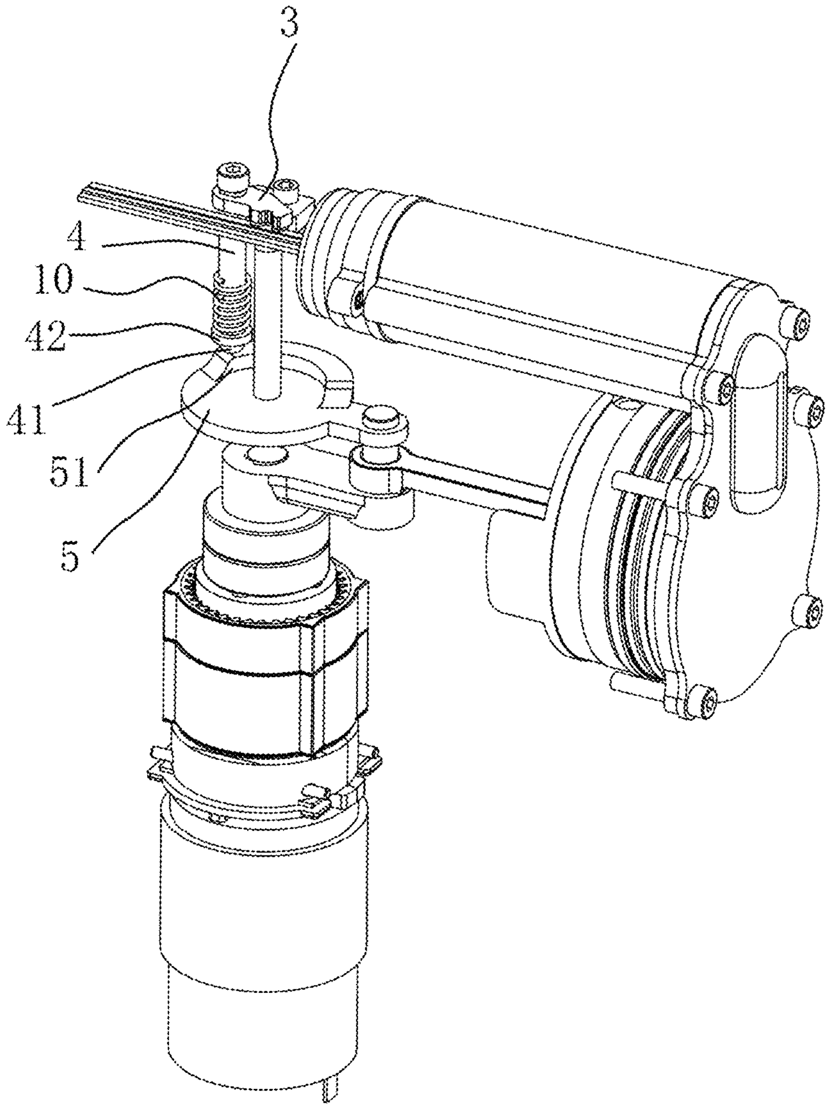
FIG. 5 is a schematic diagram of a partial structure in First Embodiment of the present disclosure.

As shown in FIG. 5, the inner shell 1*a* is further provided with a turntable 5 connected with a crank-link mechanism, and the turntable 5 is provided with a boss 51. The top shaft 4 is fixedly connected with the locking member 3, and the other end of the top shaft 4 is provided with a jacking block 41 abutting against the boss 51. Peripheries of the boss 51 and the jacking block 41 are arc-shaped, the top shaft 4 is provided with a reset spring 10 with one end capable of abutting against the inner shell 1*a*, and the other end of the reset spring 10 abuts against a limiting table 42 of the top shaft 4.

A working principle of the embodiment is that: when the firing pin 2 is locked, the jacking block 41 of the top shaft 4 make contact with the turntable 5, the reset spring 10 is in a compressed state, and under an action of the reset spring 10, the top shaft 4 and the locking member 3 are subjected to a downward force along the inner shell 1*a*, so that the locking portion 31 is located in the groove 21 of the firing pin 2 to lock the firing pin 2; and when the firing pin 2 is unlocked, the jacking block 41 of the top shaft 4 abuts against the boss 51, and the top shaft 4 drives the locking member 3 to move above the inner shell 1*a*, so that the locking portion 31 is separated from the groove 21 and finally located above the firing pin 2. As an alternative solution, when the firing pin 2 is unlocked, the locking portion 31 is separated from the groove 21 and finally located below the firing pin 2, and a corresponding driving mechanism is adjusted accordingly.

Second Embodiment

Figure 6:
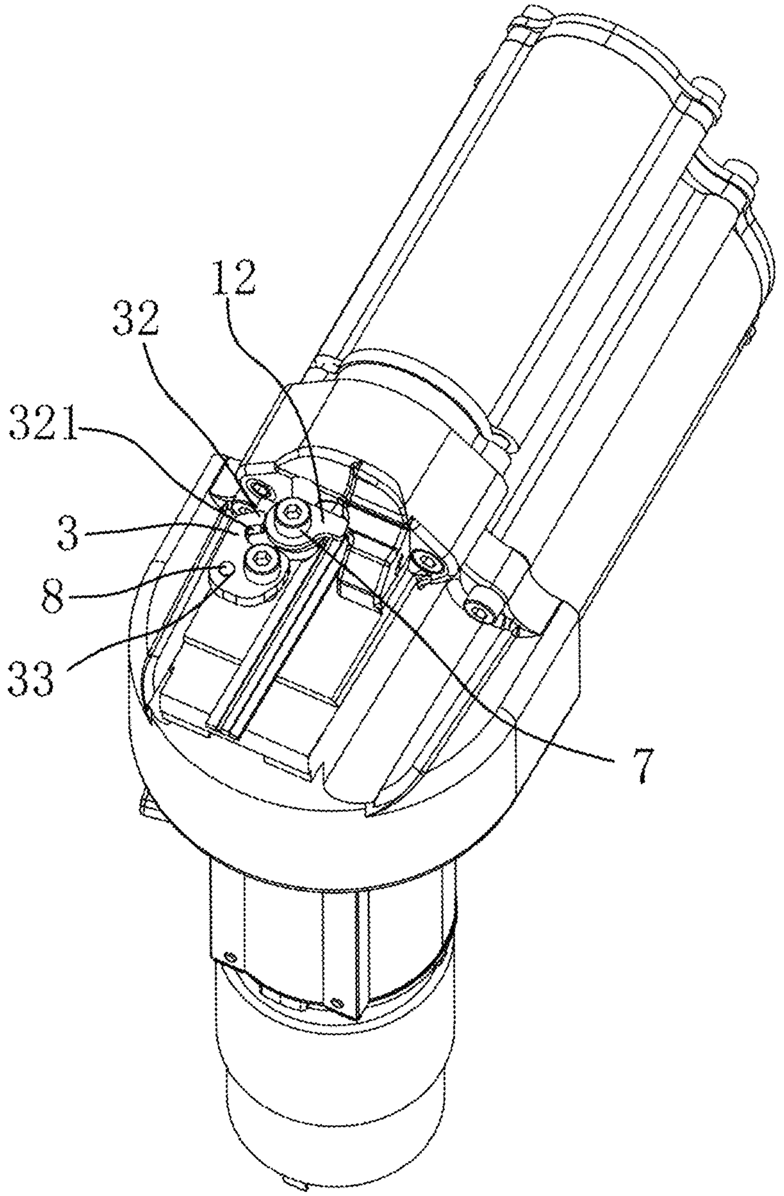
FIG. 6 is a schematic diagram of a partial structure in Second Embodiment of the present disclosure.

As shown in FIG. 6, the structure of this embodiment is basically the same as that of First Embodiment. In this embodiment, the locking member 3 indirectly locks the firing pin 2, and an intermediate member 6 is arranged between the locking member 3 and the firing pin 2. The inner shell 1*a* is rotatably connected with a rotating shaft 7, the intermediate member 6 is fixed on the rotating shaft 7, the rotating shaft 7 is further provided with a blocking sheet 12, and the blocking sheet 12 is located above the intermediate member 6. The inner shell 1*a* is further connected with a limiting shaft 8, the locking member 3 is provided with a limiting hole 33 matched with the limiting shaft 8, and the limiting shaft 8 is located in the limiting hole 33.

Figure 7:
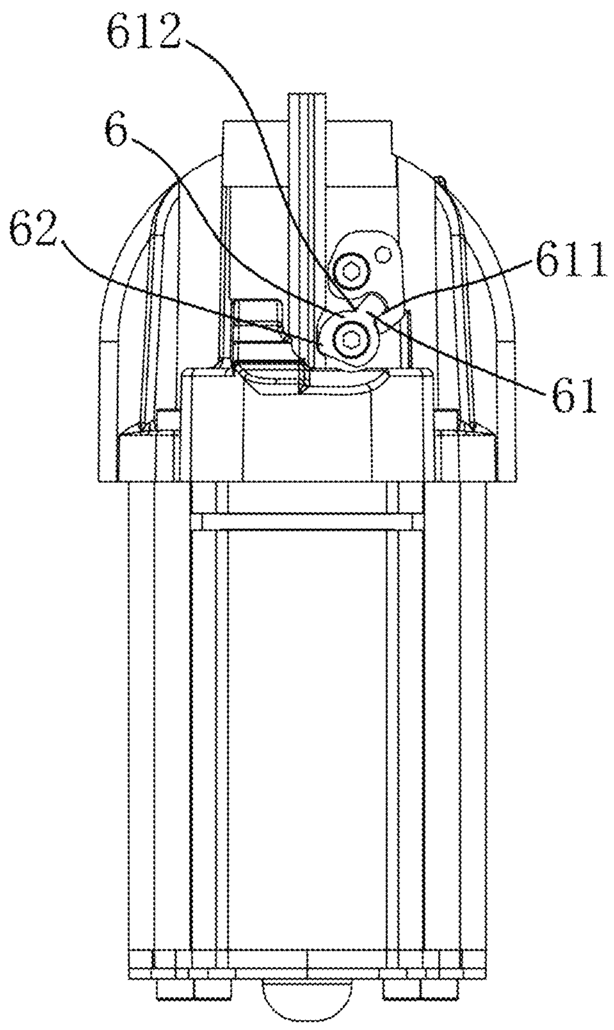
FIG. 7 is a schematic diagram of a partial structure in Second Embodiment of the present disclosure.

As shown in FIG. 7, the intermediate member 6 is provided with a first locking portion 61 and a second locking portion 62 respectively, and the second locking portion 62 is capable of being clamped in the groove 21 of the firing pin 2. An inner side of the first locking portion 61 is provided with a stopping surface 621, and an outer side of the first locking portion 61 is provided with an abutting surface 622. The locking member 3 is provided with a hook-shaped locking hook portion 32, an inner side of the locking hook portion 32 is provided with a first blocking surface 321, and an outer side of the locking hook portion 32 is provided with a second blocking surface 322. The inner shell 1*a* is further connected with a limiting shaft 8, the locking member 3 is provided with a limiting hole 33 matched with the limiting shaft 8, and the limiting shaft 8 is located in the limiting hole 33.

Figure 8:
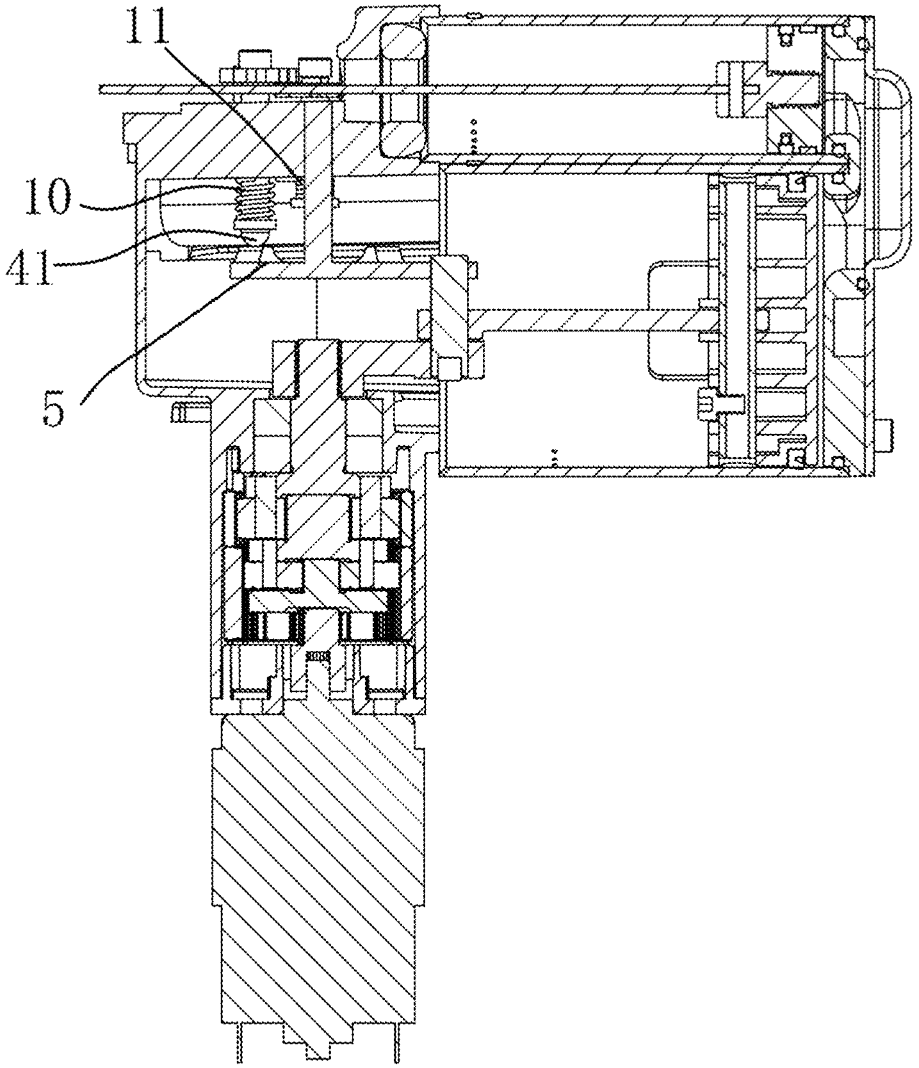
FIG. 8 is a schematic diagram of a sectional structure in Second Embodiment of the present disclosure.
Figure 9:
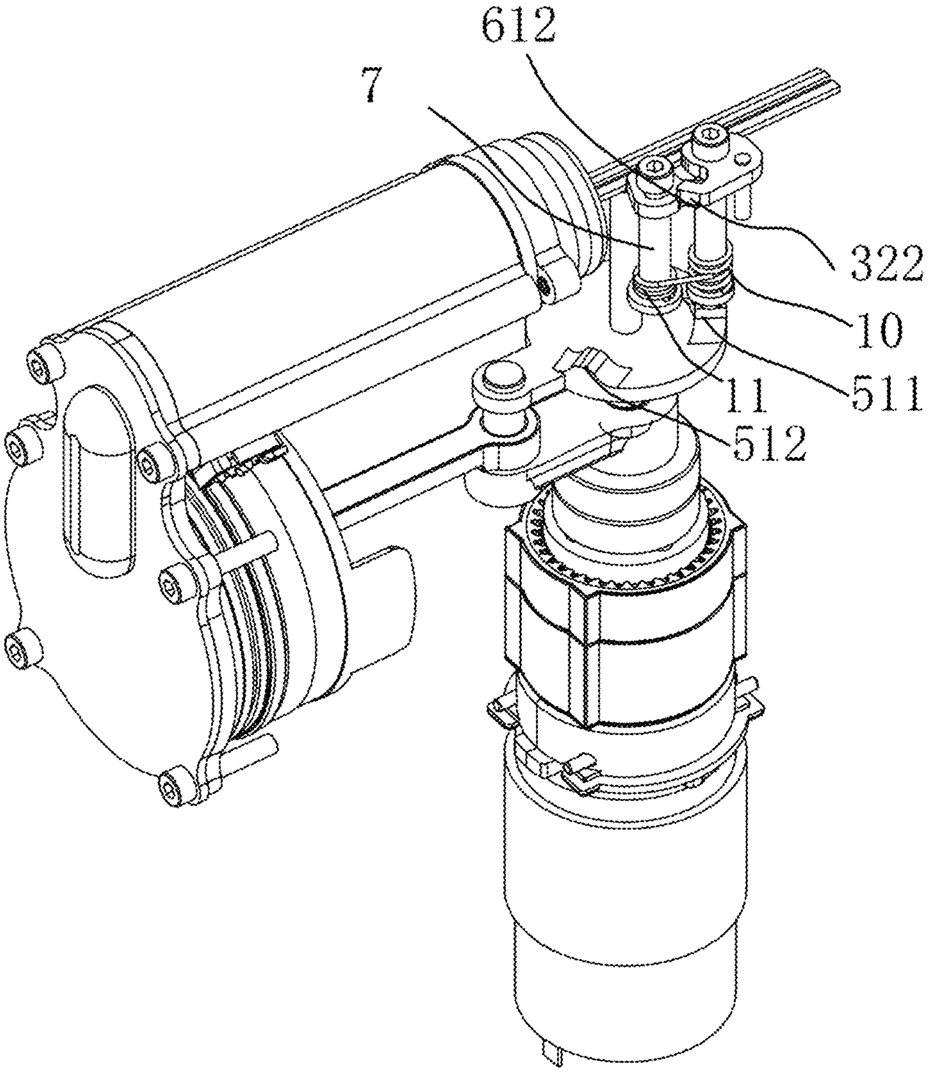
FIG. 9 is a schematic diagram of a partial structure in Second Embodiment of the present disclosure.

As shown in FIG. 8 and FIG. 9, in this embodiment, the boss 51 comprises a first boss 511 and a second boss 512. A torsion spring 11 with one end abutting against the inner shell 1*a* is sleeved on the rotating shaft 7, and the other end of the torsion spring 11 is fixedly connected to the rotating shaft 7.

A working principle of this embodiment is that: when the firing pin 2 is locked, the first blocking surface 321 is capable of abutting against the abutting surface 622 and makes the second locking portion 62 remain fixed in the groove 21 of the firing pin 2; when the firing pin 2 needs to be unlocked, the jacking block 41 of the top shaft 4 abuts against the first boss 511, the top shaft 4 drives the locking member 3 to move vertically upwards along the inner shell 1*a* at this time, the locking member 3 is located above the intermediate member 6, the intermediate member 6 is in a state of free rotation in a horizontal direction, the firing pin 2 is driven by high-pressure gas to move towards a front end of the inner shell 1*a*, the second locking portion 62 is rotated by the firing pin 2 to be completely separated from the groove 21, and at this time, the torsion spring 11 of the rotating shaft 7 is in a compressed state and one end of the torsion spring 11 abuts against the inner shell 1*a*; in order to remain a gap between the second locking portion 62 and the firing pin 2, the motor 13 drives the turntable 5 to rotate, the jacking block 41 is separated from the first boss 511, the reset spring 10 drives the top shaft 4 and the locking sheet to move vertically downward along the inner shell 1*a*, and at this time, the second blocking surface 322 is capable of abutting against the stopping surface 621 and remains a gap between the intermediate member 6 and the firing pin 2 all the time; and after the nail shooting is completed by the firing pin 2, the jacking block 41 passes through the second boss 512 on the turntable, and finally, the second locking portion 62 remains fixed in the firing pin 2 again. As an alternative solution, when the firing pin 2 is unlocked, the locking member 3 is located below the intermediate member 6, and a corresponding driving mechanism is adjusted accordingly.

Third Embodiment

The structure of Third Embodiment is basically the same as that of First Embodiment, and the only difference is that the inner shell 1*a* is further provided with an abutting shaft comprising an ejecting block. The ejecting block is connected with the locking member 3, the top shaft 4 is not provided with the jacking block 41, and the movement of the locking member 3 is realized through the ejecting block and the boss 51. In this embodiment, the abutting shaft is used for making the locking member move vertically upward, and the reset spring 10 on the top shaft 4 resets the locking member.

The specific embodiments described herein are only illustrative to the spirit of the present disclosure. Those skilled in the technical field to which the present disclosure belongs may make various modifications or supplements to the specific embodiments described or make substitutions in a similar way, without departing from the spirit of the present disclosure or exceeding the scope defined by the appended claims.

Although the terms, such as 1: shell; 2: firing pin; 21: groove; 3: locking member; 31: locking portion; 32: locking hook portion; 321: first blocking surface; 322: second blocking surface; 33: limiting hole; 4: top shaft; 41: jacking block; 42: limiting table; 5: turntable; 51: boss; 511: first boss; 512: second boss; 6: intermediate member; 61: first locking portion; 611: stopping surface; 612: abutting surface; 62: second locking portion; 7: rotating shaft; 8: limiting shaft; 9: fixing block; 10: reset spring; 11: torsion spring; 12: blocking sheet; and 13: motor, are frequently used herein, the possibility of using other terms is not excluded. These terms are only used to describe and explain the essence of the present disclosure more conveniently; and the explanation of the terms as any additional restrictions is against the spirit of the present disclosure.

What is claimed is:

1. A firing pin locking structure of a nailing gun, the nailing gun comprising:
- an inner shell,
- a firing pin, capable of moving relative to the inner shell and used for nailing,
- a locking member, used for directly locking the firing pin,
- a driving mechanism, and
- a top shaft, capable of vertically moving along the inner shell relative to the direction of movement of the firing pin,
- wherein the top shaft and the locking member are capable of vertically moving and away from the firing pin, and
- wherein the driving mechanism comprises a turntable arranged in the inner shell, the turntable is provided with at least one boss, one end of the top shaft is fixedly connected with the locking member, and the other end of the top shaft is provided with a jacking block capable of abutting against the boss, after the jacking block makes contact with the boss.

2. The firing pin locking structure of the nailing gun according to claim 1, wherein the top shaft is provided with a reset spring for resetting the top shaft, one end of the reset spring abuts against or is fixed on the top shaft, and the other end of the reset spring abuts against the inner shell.

3. The firing pin locking structure of the nailing gun according to claim 1, wherein the locking member directly locks the firing pin, the firing pin is further provided with a groove, the locking member comprises a locking portion, and when the firing pin is locked, the locking portion is located in the groove and directly locks the firing pin; and when the firing pin is unlocked, the locking portion is located above the groove.

4. The firing pin locking structure of the nailing gun according to claim 3, wherein the inner shell is further provided with a fixing block close to the locking member, the fixing block and the locking member are located on the same side of the firing pin, the fixing block is farther away from the firing pin than the locking member.

5. The firing pin locking structure of the nailing gun according to claim 4, wherein the fixing block or the locking member has an inclined plane for guiding.

6. The firing pin locking structure of the nailing gun according to claim 3, wherein the inner shell is further connected with a limiting shaft, the locking member is provided with a limiting hole matched with the limiting shaft, and the limiting shaft is located in the limiting hole.

7. The firing pin locking structure of the nailing gun according to claim 4, wherein peripheries of a boss and a jacking block are arc-shaped, the top shaft is provided with a limiting table, and a reset spring abuts against the limiting table.

8. The firing pin locking structure of the nailing gun according to claim 1, wherein a turntable connected with an output shaft of a motor is also arranged in the inner shell, the turntable is provided with a boss, the top shaft is fixedly connected with the locking member, the top shaft is provided with a reset device with one end capable of abutting against the inner shell, the other end of the reset device abuts against a limiting table of the top shaft, the locking member is further connected with an abutting shaft, one end of the abutting shaft is provided with an ejecting block, and the ejecting block is capable of abutting against the boss.

9. A firing pin locking structure of a nailing gun, wherein the nailing gun comprises:

an inner shell, a firing pin, capable of moving relative to the inner shell and used for nailing, a locking member, used for indirectly locking the firing pin via an intermediate member, a driving mechanism, and a top shaft, capable of vertically moving along the inner shell relative to the direction of movement of the firing pin, wherein the top shaft and the locking member are capable of vertically moving and away from the firing pin, and wherein the driving mechanism comprises a turntable arranged in the inner shell, the turntable is provided with at least one boss, one end of the top shaft is fixedly connected with the locking member, and the other end of the top shaft is provided with a jacking block capable of abutting against the boss, after the jacking block makes contact with the boss.

10. The firing pin locking structure of the nailing gun according to claim 9, wherein the locking member indirectly locks the firing pin, the firing pin is provided with a groove, an intermediate member is arranged between the locking member and the firing pin, the intermediate member is provided with a first locking portion and a second locking portion capable of being clamped on the firing pin respectively, the locking member is capable of abutting against the first locking portion and preventing the intermediate member from moving relative to the inner shell, so that the second locking portion and the groove of the firing pin remain clamped, the inner shell is rotatably connected with a rotating shaft, a torsion spring with one end abutting against the inner shell is sleeved on the rotating shaft, the other end of the torsion spring is fixedly connected to the rotating shaft, the intermediate member is connected to the rotating shaft, and when the firing pin is unlocked, the locking member is located above the intermediate member.

* * * * *